(12) United States Patent
Chung et al.

(10) Patent No.: US 11,480,218 B2
(45) Date of Patent: Oct. 25, 2022

(54) UNIVERSAL JOINT ASSEMBLY

(71) Applicants: HYUNDAI MOTOR COMPANY, Seoul (KR); KIA MOTORS CORPORATION, Seoul (KR)

(72) Inventors: Sung Hoon Chung, Yongin-si (KR); Dong Wook Lee, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 366 days.

(21) Appl. No.: 16/781,585

(22) Filed: Feb. 4, 2020

(65) Prior Publication Data

US 2021/0040994 A1   Feb. 11, 2021

(30) Foreign Application Priority Data

Aug. 7, 2019 (KR) ................. 10-2019-0096250

(51) Int. Cl.
*F16D 1/08* (2006.01)
*F16D 3/32* (2006.01)
*F16D 3/38* (2006.01)

(52) U.S. Cl.
CPC ............ *F16D 1/0864* (2013.01); *F16D 3/32* (2013.01); *F16D 3/387* (2013.01); *F16D 2250/0084* (2013.01); *Y10T 403/1608* (2015.01); *Y10T 403/7084* (2015.01)

(58) Field of Classification Search
CPC .......... F16D 1/0864; F16D 3/32; F16D 3/387; F16D 2250/0084; Y10T 403/1608; Y10T 403/7084
USPC .............................................. 464/134; 403/12
See application file for complete search history.

(56) References Cited

U.S. PATENT DOCUMENTS

| | | | | |
|---|---|---|---|---|
| 4,537,523 A | * | 8/1985 | Haldric ................. | F16D 1/0864 403/12 |
| 8,038,362 B2 | * | 10/2011 | Kawanabe .............. | F16D 3/387 403/11 |

FOREIGN PATENT DOCUMENTS

| | | |
|---|---|---|
| JP | H06-221333 A | 8/1994 |
| KR | 10-2010-0010599 A | 2/2010 |
| KR | 2012-0063823 A | 6/2012 |

* cited by examiner

*Primary Examiner* — Greg Binda
(74) *Attorney, Agent, or Firm* — Morgan, Lewis & Bockius LLP

(57) ABSTRACT

A universal joint assembly includes a yoke including a serration hole to receive an end portion of a steering column and a bolt-hole to receive a bolt which is used to restrict the steering column received in the serration hole, and a misassembly prevention member coupled to the yoke and elastically movable from a first position in which the bolt-hole is at least partially blocked to a second position in which the bolt-hole is opened, thereby preventing a misassembly of the steering column and improving safety and reliability of the universal joint assembly.

6 Claims, 9 Drawing Sheets

UNIVERSAL JOINT ASSEMBLY

CROSS-REFERENCE TO RELATED APPLICATION

The present application claims the benefit of priority to Korean Patent Application No. 10-2019-0096250, filed on Aug. 7, 2019 in the Korean Intellectual Property Office, the entire disclosure of which is incorporated herein by reference.

TECHNICAL FIELD

The present disclosure relates to a universal joint assembly, and more particularly to a universal joint assembly capable of preventing a steering column from being misassembled for improving safety and reliability.

BACKGROUND

In general, a steering system of a vehicle includes a steering wheel, a steering column rotating by the steering wheel, a steering gear to convert a rotational motion of the steering column into a linear motion to be transmitted to a tie-rod, and a steering joint linking the steering column with the steering gear.

The steering joint includes a universal joint, so yokes are provided at opposite ends of the steering joint. The yoke provided at one end of the steering joint is coupled to the steering column, and the yoke provided at an opposite end of the steering joint is coupled to the shaft of the steering gear.

The yoke has a serration hole and a bolt-hole, and the bolt-hole is formed to communicate with the serration hole to be perpendicular to the serration hole.

The end portion of the steering column is inserted into the serration hole, and a serration engaged with the serration hole and a bolt receiving groove recessed in the concave shape are formed along the outer circumferential surface of the end portion of the steering column.

The assembling process between the steering column and the yoke is completed by assembling a bolt with a bolt-hole of the yoke in the state that the end portion of the steering column is inserted to the end of the serration hole of the yoke.

In other words, when the bolt is coupled to the bolt-hole of the yoke in the state that the end portion of the steering column is inserted into the serration hole of the yoke, as the bolt is received in the bot receiving groove of the steering column, the steering column is prevented from being separated from the serration hole, thereby completing the assembling between the steering column and the yoke.

However, when the bolt is coupled to the bolt-hole of the yoke in the state that the end portion of the steering column is not inserted till the end of the serration hole of the yoke due to the carelessness of a worker, the bolt may not be locked into the bolt receiving groove of the steering column, so the steering column may be separated from the serration hole. When the steering column is separated from the serration hole 110 during driving, it becomes difficult to transmit the steering force through the steering joint, so the serious accident may occur.

Accordingly, recently, various studies and researches have been performed to improve the safety and the reliability while preventing the steering column from being misassembled, but are still insufficient. Accordingly, the studies and researches have to be further developed.

The above information disclosed in this Background section is only for enhancement of understanding of the background of the present disclosure, and should not be taken as acknowledgement that this information forms the prior art that is already known to a person skilled in the art.

SUMMARY

The present disclosure has been made to solve the above-mentioned problems occurring in the prior art while advantages achieved by the prior art are maintained intact.

According to an aspect of the present disclosure, a universal joint assembly may prevent a misassembly of a steering column for improving safety and reliability.

Another aspect of the present disclosure is to prevent a new steering column from being misassembled when replacing an old steering column.

In addition, another aspect of the present disclosure is to simplify the structure and improve the space efficiency and the design freedom.

In addition, another aspect of the present disclosure is to simplify the assembly and replacement processes of the steering column.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a universal joint assembly includes a yoke including a serration hole to receive an end portion of a steering column and a bolt-hole to receive a bolt which is used to restrict the steering column received in the serration hole, and a misassembly prevention member coupled to the yoke and elastically movable from a first position in which the bolt-hole is at least partially blocked to a second position in which the bolt-hole is opened.

Accordingly, the misassembly of a steering column is prevented and the safety and reliability is improved.

In other words, when the bolt is coupled to the bolt-hole of the yoke in the state that the end portion of the steering column is not inserted to the end of the serration hole of the yoke, the bolt may not be locked into a bolt receiving groove of the steering column, so the steering column may be separated from the serration hole. When the steering column is separated from the serration hole during driving, it becomes difficult to transmit the steering force through the steering joint, so the serious accident may occur.

However, according to an aspect of the present disclosure, the misassembly of the steering column may be prevented and the safety and the reliability may be improved, by preventing the bolt from being coupled to the bolt-hole, in the state that the end portion of the steering column is not inserted to the end of the serration hole of the yoke.

According to an aspect of the present disclosure, the misassembly preventing member elastically move from the first position to the second position, thereby preventing the new steering column from being misassembled when replacing the old steering column.

In other words, conventionally, when the steering column is separated from the yoke, the misassembly prevention member, which prevents the steering column from being misassembled, is not returned to a position to block the bolt-hole. Accordingly, it is difficult to prevent a steering column, which is mounted newly, from being misassembled.

However, according to an aspect of the present disclosure, when the steering column is separated from the yoke in the state that the misassembly prevention member moves from the first position to the second position, the misassembly prevention member is elastically returned to the first position again, thereby preventing a newly installed steering column from being misaligned when being mounted.

The misassembly prevention member may be formed in various structures elastically movable from the first position to the second position.

For example, the misassembly prevention member includes a fixing portion fixed to the yoke, and a movable portion coupled to the fixing portion and elastically movable from the first position to the second position.

Preferably, the movable portion is pushed by the end portion of the steering column to elastically move from the first position to the second position when the end portion of the steering column is introduced into the serration hole. The movable portion is elastically returned from the second position to the first position when the end portion of the steering column is withdrawn out of the serration hole.

In addition, the yoke includes a guide slot connected to the bolt-hole and the serration hole, such that the movable portion can be moved from the first position to the second position on the guide slot.

More preferably, the universal joint assembly further includes an elastic extension portion extending from the fixing portion and being elastically rotatable with respect to the fixing portion. The elastic extension portion is disposed on an outer portion of the guide slot, and the movable portion is connected with the elastic extension portion perpendicularly to the elastic extension portion.

As described above, the elastic extension portion extends from, and is elastically rotatable with respect to, the fixing portion, and the movable portion is connected with the elastic extension portion. As such, the distortion of the movable portion can be minimized while ensuring the smooth rotation of the movable portion.

In this case, the movable portion is configured to partially block the bolt-hole at the first position and to be arranged inside the guide slot at the second position.

As described above, the movable portion partially blocks the bolt-hole at the first position and is disposed inside the guide slot without protruding out of the guide slot at the second position, thereby preventing interference between the movable portion and peripheral parts and ensuring the smooth rotation of the yoke.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
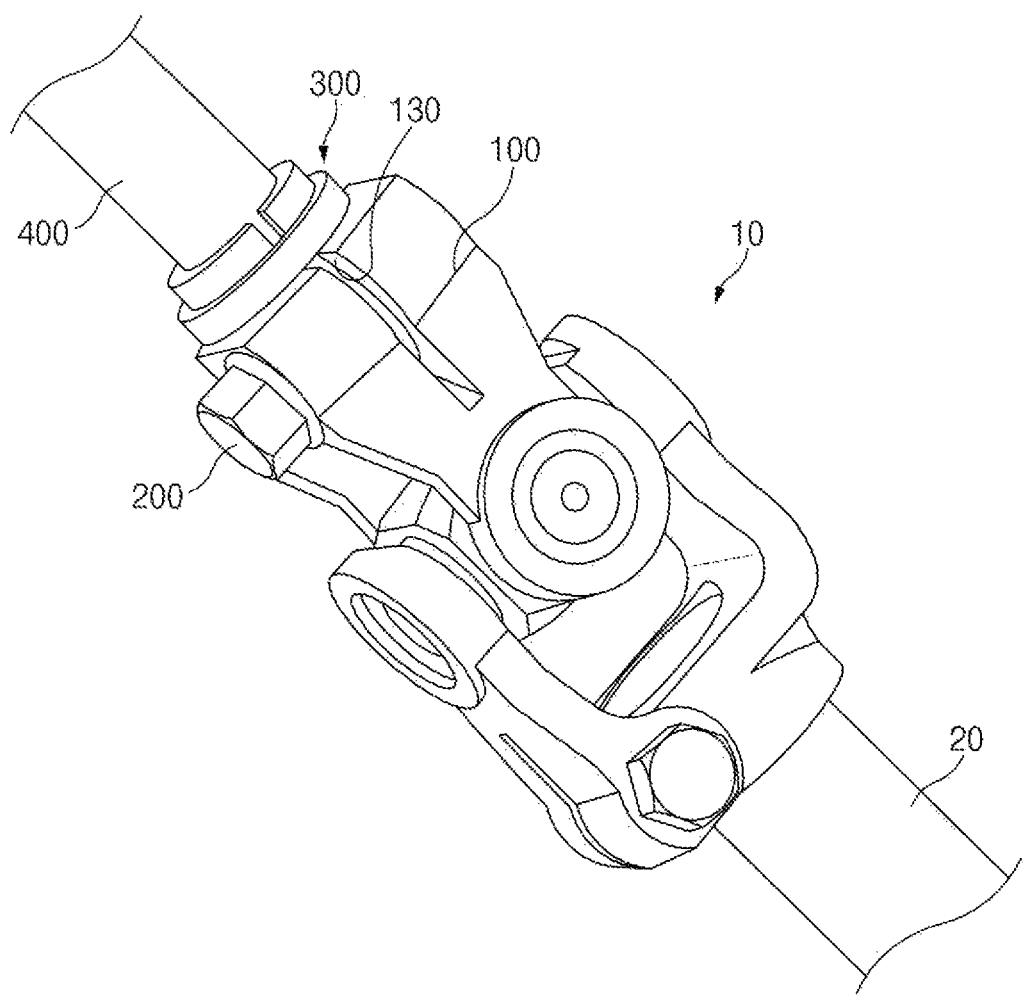
FIG. 1 is a view illustrating a universal joint assembly, according to an exemplary embodiment of the present disclosure.

Hereinafter, exemplary embodiments of the present disclosure will be described in detail with reference to accompanying drawings, and the present disclosure is not limited thereto. For reference, in the following description, the same reference numeral will be actually assigned to the same components. According to this principle, the description of the same component assigned with the same reference numeral in a different drawing will be employed, and the duplicated description considered as being obvious to those skilled in the art will be omitted.

Figure 2:
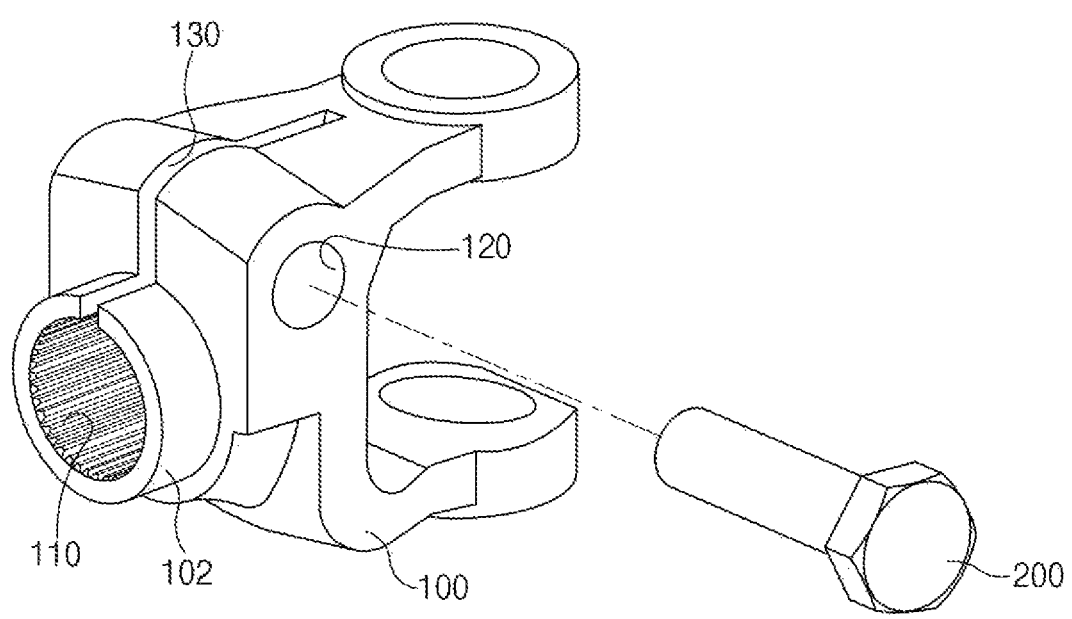
FIG. 2 is a view illustrating a yoke in a universal joint assembly, according to an exemplary embodiment of the present disclosure.
Figure 3:
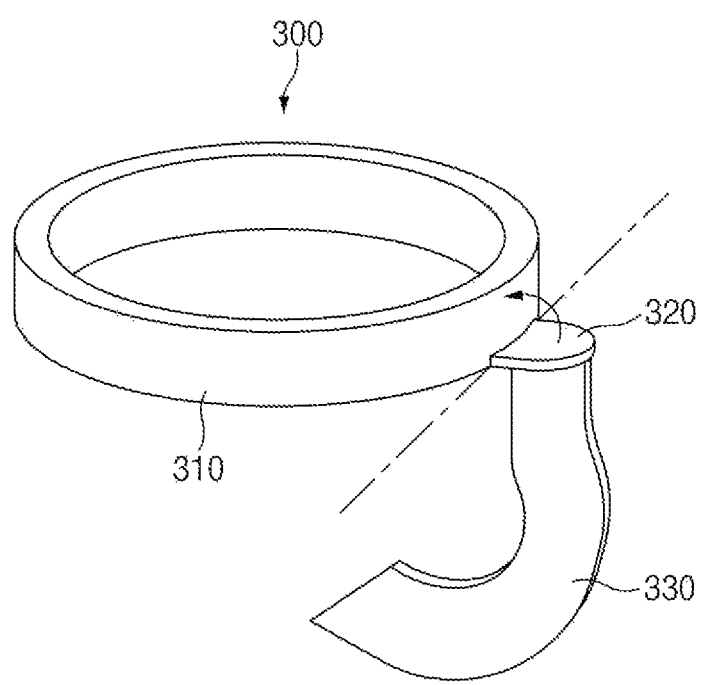
FIGS. 3 and 4 are views illustrating a misassembly prevention member in a universal joint assembly, according to an exemplary embodiment of the present disclosure.
Figure 4:
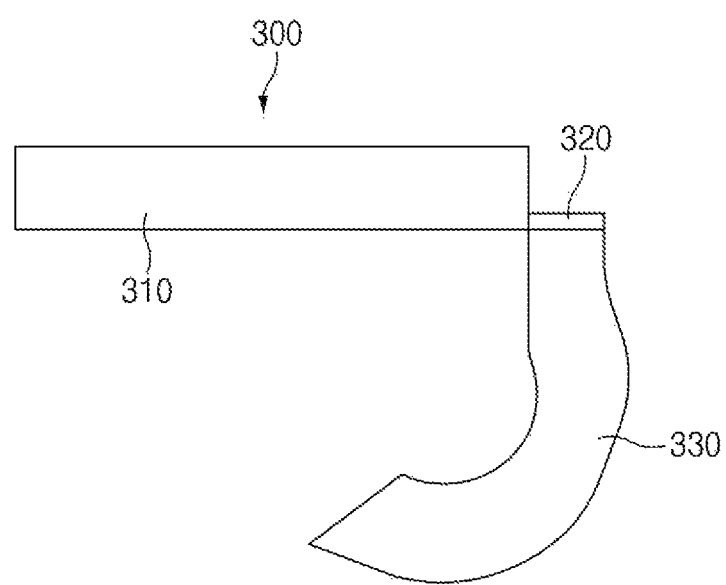
Figure 5:
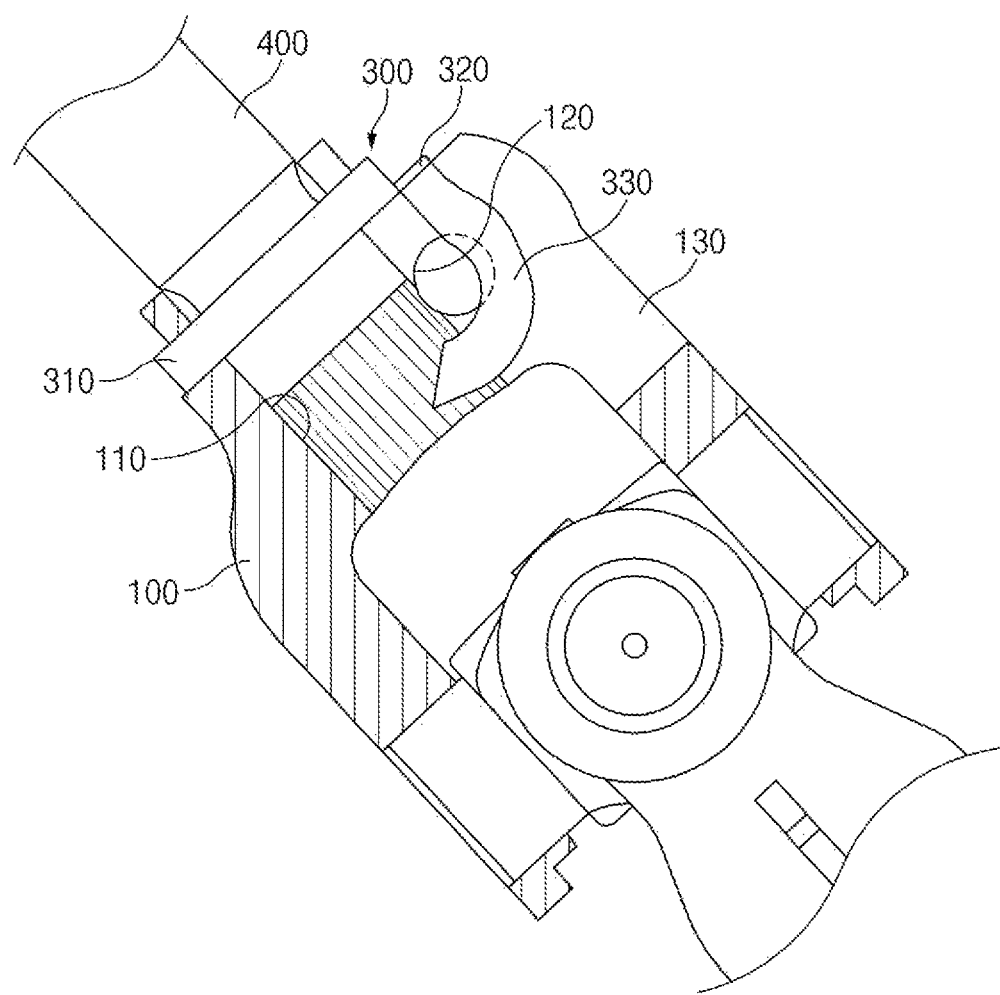
FIGS. 5 and 6 are views illustrating the operating structure of a misassembly prevention member in a universal joint assembly, according to an exemplary embodiment of the present disclosure.
Figure 6:
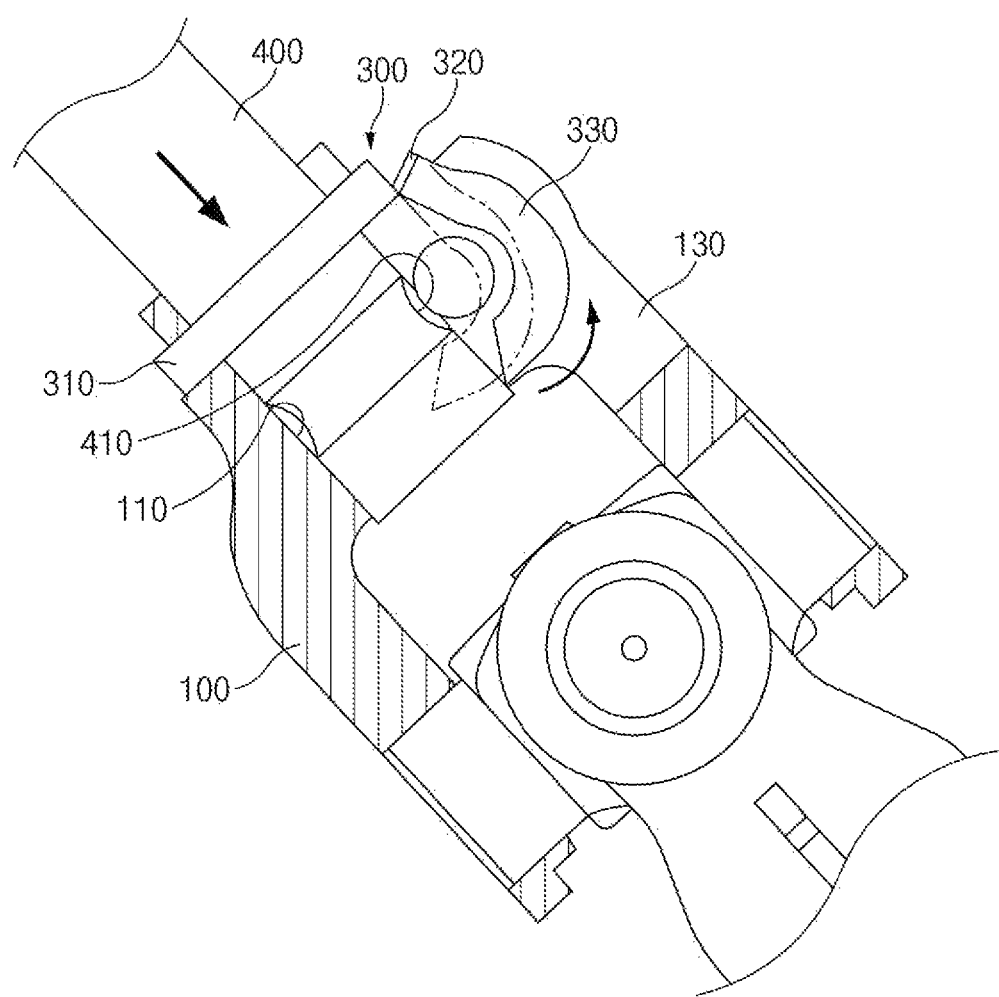
Figure 7:
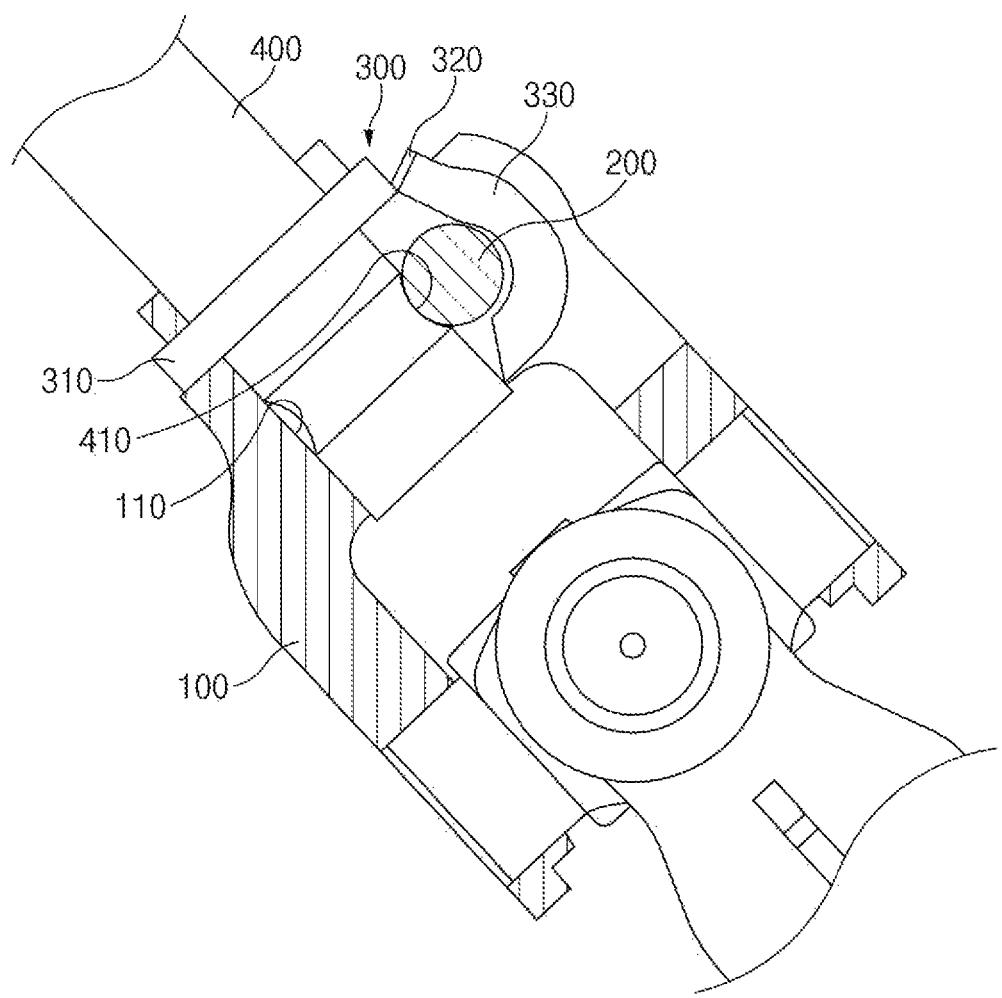
FIG. 7 is a view illustrating the coupling state of a bolt in a universal joint assembly, according to an exemplary embodiment of the present disclosure.
Figure 8:
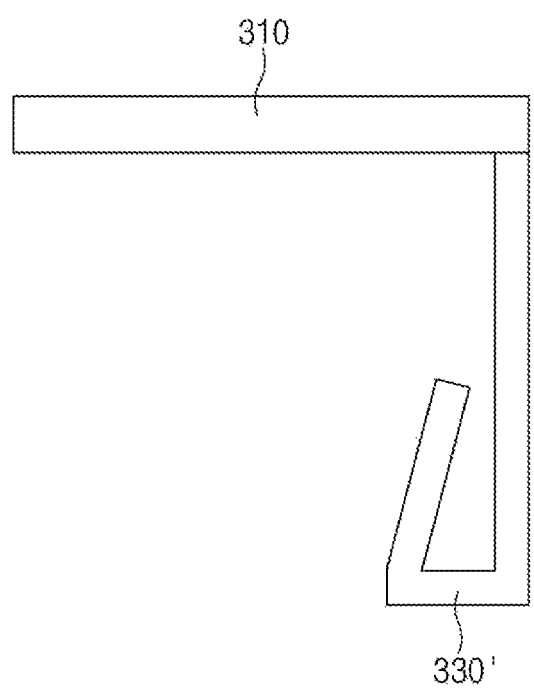
FIGS. 8 and 9 are views illustrating modifications of a misassembly prevention member in a universal joint assembly, according to exemplary embodiments of the present disclosure.
Figure 9:
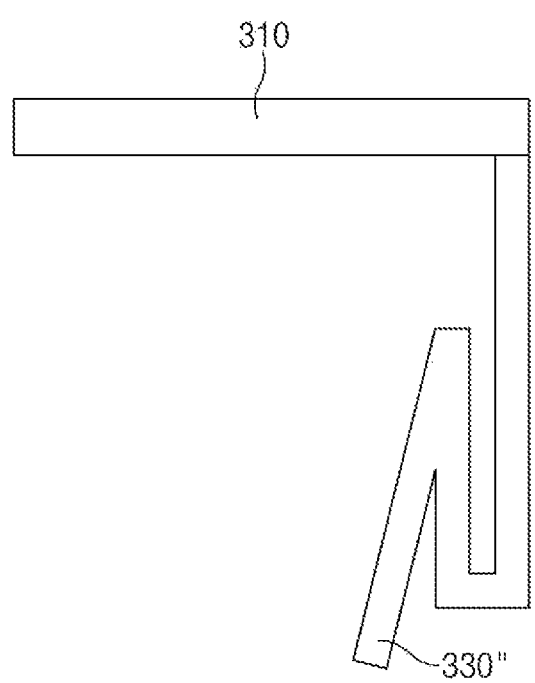

FIG. 1 is a view illustrating a universal joint assembly, according to an exemplary embodiment of the present disclosure, FIG. 2 is a view illustrating a yoke in a universal joint assembly, according to an exemplary embodiment of the present disclosure, FIGS. 3 and 4 are views illustrating a misassembly prevention member in a universal joint assembly, according to an exemplary embodiment of the present disclosure. In addition, FIGS. 5 and 6 are views illustrating the operating structure of a misassembly prevention member in a universal joint assembly, according to an exemplary embodiment of the present disclosure, and FIG. 7 is a view illustrating the coupling state of a bolt in a universal joint assembly, according to an exemplary embodiment of the present disclosure. FIGS. 8 and 9 are views illustrating modifications of a misassembly prevention member in a universal joint assembly, according to exemplary embodiments of the present disclosure.

Referring to FIGS. 1 to 9, according to exemplary embodiments of the present disclosure, a universal joint assembly 10 includes a serration hole 110 to receive an end portion of a steering column 400, a yoke 100 having a bolt-hole 120, which is used to receive a bolt 200 to restrict the steering column 400 received in the serration hole 110, and a misassembly prevention member 300 which is coupled to the yoke 100 and elastically movable from a first position in which the bolt-hole 120 is at least partially blocked to a second position in which the bolt-hole 120 is opened.

According to an exemplary embodiment of the present disclosure, the universal joint assembly 10 may be used to link the steering column 400 rotating the steering wheel (not illustrated) to a steering gear (not illustrated).

Referring to FIG. 2, the yoke 100 is provided rotatably at the end portion of the steering joint 20, and the steering column 400 is assembled with the yoke 100.

In more detail, the yoke 100 has the serration hole 110 to receive (insert) an end portion of the steering column 400, and the bolt-hole 120 coupled to the bolt 200.

The serration hole 110 is formed through the yoke 100 in an axial direction of the steering column 400, and the bolt-hole 120 is formed to partially communicate with the serration hole 110 to be perpendicular to the serration hole 110.

In this case, the bolt-hole 120 is formed to partially communicate with the serration hole 110 such that the bolt-hole 120 is spatially connected with a portion of the serration hole 110.

Furthermore, a serration (not illustrated) engaged with the serration hole 110 is formed on an outer circumferential surface of the end portion of the steering column 400. The bolt receiving groove 410 is formed in an outer circumferential surface of the steering column 400, which is adjacent to the end portion of the steering column 400), while being recessed in a concave shape (e.g., in the semicircular cross section) in a circumferential direction of the steering column 400.

The bolt 200 is coupled to the bolt-hole 120 to restrict the steering column 400 received in the serration hole 110.

In more detail, the assembling process of the steering column 400 and the yoke 100 is completed by assembling the bolt 200 with the bolt-hole 120 of the yoke 100, in the state that the end portion of the steering column 400 is inserted to the end of the yoke 100.

In other words, when the bolt 200 is coupled to the bolt-hole 120 of the yoke 100 in the state that the end portion of the steering column 400 is inserted into the serration hole 110 of the yoke 100 (see FIG. 7), the bolt 200 is received into the bolt receiving groove 410 of the steering column 400, thereby preventing the steering column 400 from being separated from the serration hole 110. In this way, the assembling between the steering column 400 and the yoke 100 is completed.

The misassembly prevention member 300 is provided to prevent the bolt 200 from being coupled to the bolt-hole 120 in the state that the end portion of the steering column 400 is not inserted to the end of the serration hole 110 of the yoke 100.

In more detail, the misassembly prevention member 300 is provided to be elastically movable from the first position in which the bolt-hole 120 is at least partially blocked to the second position in which the bolt-hole 120 is opened.

In this case, the misassembly prevention member 300 is provided at the first position, such that an entire portion or some portion of the misassembly prevention member 300 is disposed to block at least a portion of the bolt-hole 120. In the state that the misassembly prevention member 300 is disposed at the first position, the bolt 200 is blocked by the misassembly prevention member 300. Accordingly, the bolt 200 may not be coupled to the end of the bolt-hole 120.

In addition, the misassembly prevention member 300 is disposed at the second position to open the bolt-hole 120, such that the misassembly prevention member 300 is not overlapped with the bolt-hole 120. In the state that the misassembly prevention member 300 is disposed at the second position, the bolt-hole 120 may be entirely open without blocking the misassembly prevention member 300. Accordingly, the bolt 200 may be coupled to the end of the bolt-hole 120.

The misassembly prevention member 300 may be formed in various structures enough to be elastically movable from the first position in which the bolt-hole 120 is at least partially blocked to the second position in which the bolt-hole 120 is opened.

For example, referring to FIGS. 3 and 4, the misassembly prevention member 300 may include a fixing portion 310 to fix the yoke 100 and a movable portion 330 coupled to the fixing portion 310 such that the movable portion 330 is elastically movable from the first position in which the bolt-hole 120 is at least partially blocked to the second position in which the bolt-hole 120 is opened.

Preferably, the movable portion 330 is configured to elastically move from the first position to the second position, as the movable portion 330 is pushed by the end portion of the steering column 400 when the end portion of the steering column 400 is introduced into the serration hole 110 (see FIG. 6). To the contrary, the movable portion 330 is configured to be elastically returned to the first position from the second position, when the end portion of the steering column 400 is withdrawn out of the serration hole 110 (see FIG. 5).

The fixing portion 310 may be formed in the ring shape and may be fixedly fitted around the outer surface of a neck portion 102 protruding from the end portion of the yoke 100. According to another exemplary embodiment, an additional fixing member may be used or another structure may be formed in the yoke 100 such that the fixing portion 310 is fixed to the yoke 100. In addition, the present disclosure is not limited to the fixing structure of the fixing portion 310.

Preferably, the yoke 100 includes a guide slot 130 connected to the bolt-hole 120 and the serration hole 110, and the movable portion 330 is disposed to be moved from the first position to the second position on the guide slot 130.

The guide slot 130 is formed in a lengthwise direction of the serration hole 110 (e.g., the axial direction of the steering column 400) to communicate with the serration hole 110, and the bolt-hole 120 (e.g., the central portion of the bolt-hole 120) may be connected to the guide slot 130.

The movable portion 330 may be disposed inside the guide slot 130 in the state that the fixing portion 310 is coupled to the neck portion 102. The movable portion 330 disposed in the guide slot 130 may elastically move from the first position to the second position, as the end portion of the steering column 400 makes contact with or is separated from the movable portion 330.

The movable portion 330 may be formed in various shapes and structures enough to make contact with the end portion of the steering column 400 introduced into the serration hole 110. In this case, the present disclosure is not limited to the shape and the structure of the movable portion 330.

For example, the movable portion 330 may be formed in a J shape (or arc shape) as the movable portion 330 is bent, and the end portion of the movable portion 330 is disposed to make contact with the end portion of the steering column 400 introduced into the serration hole 110.

According to another exemplary embodiment of the present disclosure, the movable portion 330 may include a bending portion to make contact with the end portion of the steering column 400 introduced into the serration hole 110. For example, referring to FIG. 8, a movable portion 330' may be formed in a U shape including a bending portion (not illustrated) to make contact with the end portion of the steering column 400. Alternatively, as illustrated in FIG. 9, a movable portion 330" may be formed in a zigzag shape with bending portions (not illustrated) consecutively connected with each other and making contact with the end portion of the steering column 400.

More preferably, the universal joint assembly 10 includes an elastic extension portion 320 extending from, and elastically rotatable (e.g., bendable) with respect to, the fixing portion 310. The elastic extension portion 320 may be disposed on an outer portion of the guide slot 130, and the movable portion 330 may be connected with the elastic extension portion 320 perpendicularly to the elastic extension portion 320.

For example, the elastic extension portion 320 may extend from the fixing portion 310 and may be elastically rotatable based on the central line (e.g., the tangential line to the outer circumferential surface of the fixing portion 310 shown in FIG. 3) perpendicular to the direction in which the steering column 400 is introduced into the serration hole 110

(i.e., the axial direction of the steering column 400). The movable portion 330 may be connected with the elastic extension portion 320 perpendicularly to the elastic extension portion 320. The movable portion 330 may rotate together with the elastic extension portion 320 as the elastic extension portion 320 rotates about the fixing portion 310.

As described above, the elastic extension portion 320 may extend from the fixing portion 310, and the movable portion 330 may be connected with the elastic extension portion 320, thereby minimizing the distortion of the movable portion 330 while ensuring the smooth rotation of the movable portion 330.

In this case, the movable portion 330 is configured to partially block the bolt-hole 120 at the first position and to be disposed inside the guide slot 130 at the second position.

As described above, the movable portion 330 partially blocks the bolt-hole 120 at the first position and is disposed inside the guide slot 130 without protruding out of the guide slot 130 (protruding out of the yoke 100) at the second position, thereby preventing an interference between the movable portion 330 and peripheral parts and ensuring a smooth rotation of the yoke 100.

Although exemplary embodiments of the present disclosure have been described for illustrative purposes, those skilled in the art will appreciate that various modifications and substitutions may be possible without departing from the scope and spirit of the disclosure as embodied in the accompanying claims.

As described above, according to exemplary embodiments of the present disclosure, a universal joint assembly may prevent a steering column from being misaligned for improving safety and reliability.

According to exemplary embodiments of the present disclosure, the newly installed steering column may be prevented from being misassembled when replacing the old steering column.

According to exemplary embodiments of the present disclosure, the structure may be simplified, and the space efficiency and the design freedom may be improved.

In addition, according to exemplary embodiments of the present disclosure, the assembling and replacement processes of the steering column may be simplified.

Hereinabove, although the present disclosure has been described with reference to exemplary embodiments and the accompanying drawings, the present disclosure is not limited thereto, but may be various modified and altered by those skilled in the art to which the present disclosure pertains without departing from the spirit and scope of the present disclosure claimed in the following claims.

What is claimed is:

1. A universal joint assembly comprising:
    a yoke including a serration hole to receive an end portion of a steering column and a bolt-hole to receive a bolt which is used to restrict the steering column received in the serration hole; and
    a misassembly prevention member coupled to the yoke and elastically movable from a first position in which the bolt-hole is at least partially blocked to a second position in which the bolt-hole is opened,
    wherein the misassembly prevention member includes:
        a fixing portion to fix the yoke; and
        a moveable portion connected with the fixing portion and elastically rotatable based on the fixing portion from the first position to the second position.

2. The universal joint assembly of claim 1, wherein the movable portion is configured such that:
    the movable portion is pushed by the end portion of the steering column to elastically move from the first position to the second position when the end portion of the steering column is introduced into the serration hole, and
    the movable portion is elastically returned from the second position to the first position when the end portion of the steering column is withdrawn out of the serration hole.

3. The universal joint assembly of claim 2, wherein the yoke includes a guide slot connected to the bolt-hole and the serration hole, such that the movable portion moves from the first position to the second position on the guide slot.

4. The universal joint assembly of claim 3, further comprising:
    an elastic extension portion extending from, and being elastically rotatable with respect to, the fixing portion, the elastic extension portion disposed on an outer portion of the guide slot, and
    wherein the movable portion is connected with the elastic extension portion perpendicularly to the elastic extension portion.

5. The universal joint assembly of claim 3, wherein the movable portion is arranged and configured such that the movable portion partially blocks the bolt-hole at the first position and is disposed inside the guide slot at the second position.

6. The universal joint assembly of claim 1, wherein a neck portion protrudes from the yoke, and
    wherein the fixing portion is coupled to an outer surface of the neck portion.

* * * * *